US005971858A

United States Patent [19]
Aurora

[11] Patent Number: 5,971,858
[45] Date of Patent: Oct. 26, 1999

[54] PROTECTIVE CASING WITH RING FOR SHAFTS, IN PARTICULAR CARDAN SHAFTS

[75] Inventor: Igino Aurora, Miglianico, Italy

[73] Assignee: Eurocardan S.p.A., Atess, Italy

[21] Appl. No.: 08/964,337

[22] Filed: Nov. 4, 1997

[30] Foreign Application Priority Data

Nov. 8, 1996 [IT] Italy ................................ RM96A0766

[51] Int. Cl.[6] ........................................................ F16C 1/26
[52] U.S. Cl. ............................................... 464/172; 74/609
[58] Field of Search .................................... 464/170, 172, 464/173, 175; 74/608, 609

[56] References Cited

U.S. PATENT DOCUMENTS

| | | | |
|---|---|---|---|
| 4,107,952 | 8/1978 | Geisthoff | 464/175 |
| 4,338,797 | 7/1982 | Herchenbach | 464/172 |
| 4,411,636 | 10/1983 | Buthe et al. | 464/172 |
| 4,435,166 | 3/1984 | Bondioli | 464/172 |
| 4,443,207 | 4/1984 | Buthe et al. | 464/175 |
| 4,747,804 | 5/1988 | Benzi | 464/172 |
| 5,169,358 | 12/1992 | Bondioli | 74/609 |
| 5,173,082 | 12/1992 | Bondioli | 464/172 |
| 5,509,858 | 4/1996 | Grosse-Entrup | 464/172 |
| 5,800,271 | 9/1998 | Herchenbach et al. | 464/172 |

*Primary Examiner*—Eileen Dunn Lillis
*Attorney, Agent, or Firm*—Browdy and Neimark

[57] ABSTRACT

A protective casing with ring for shafts, in particular cardanic shafts. It comprises, coaxially, a casing, a sleeve ring, and a tubular element. A first end of the sleeve of the ring is destined to engage with a circumferentially groove of the joint, and a second end of the sleeve is adjacent to a constraining end of the casing encompassing the ring. The ring and the casing present, in their respective constraining ends, a multiplicity of hook shaped circumferentially equidistant protrusions, destined to be juxtaposed alternatively forming a circumferential throat for a split elastic locking ring. A rigid annular safety element may cover said constraining ends of the casing and of the ring.

4 Claims, 2 Drawing Sheets

PROTECTIVE CASING WITH RING FOR SHAFTS, IN PARTICULAR CARDAN SHAFTS

BACKGROUND OF THE INVENTION

The present invention relates to a protective casing with ring for shafts, in particular Cardan shafts.

The invention relates to protections, generally made of plastic material, destined to cover externally shaft portions and joints of transmission shafts, commonly cardanic shafts. Such protections normally comprise a soft casing, and an essentially rigid ring and tubular element. The casing covers the joint, whereas the tubular element covers the shaft portion. The ring, split longitudinally and destined to engage with a circumferential groove obtained on the inner fork of the joint, is used to maintain the casing in position, and possibly also the tubular element, allowing for the normal rotation of the joint. Commonly, to prevent the ring from detaching in use, a rigid cylindrical cap is provided to block the ring onto the circumferential groove of the joint fork, and the soft casing is inserted on the rigid cap, normally by snapping it in.

For reasons of cost-efficiency, practicality and functionality, single-piece casing and cap, made of a soft material, are already constructed. Prior art solutions however present a drawback, mentioned below. The ring and the tubular element are kept in position by a band, which is part of the single-piece casing and cap; as a result of stresses, and since said single piece, especially at high temperatures, is subject to warping, the ring, not being constrained any longer, risks widening and disengaging the tubular element and the joint casing. This not only could bring about a relative motion between tubular element and casing, but it also has obvious negative consequences for safety.

The above drawback has already been resolved in the case of small joints, with a soft casing blocking a ring and a tubular element. Inserting, from the shaft side, the casing on the ring, which is engaged on the circumferential groove of the joint fork, two tabs of the ring snap in corresponding seats obtained in the casing, preventing the inverse motion, and thus detachment. On disassembly, two holes provided on the casing in correspondence with the tabs of the ring allow to insert the tip of a tool, for instance a screwdriver, and to act on the tabs, bending them and disengaging them from the aforesaid seats of the casing.

In case of large joints, the problem of the stable connection of the ring and of the casing in all operating conditions cannot be resolved through the simple system mentioned above, because the casing is deformable. Moreover, the tabs of the ring, which are forced onto the seats of the casing as a result of high axial forces, tend to warp them and to disengage therefrom. It it not possible to construct multiple locking tabs, both due to construction problems and because disassembling the protection would require the simultaneous pressure on multiple ring tabs to bend them and disengage them from the casing.

SUMMARY OF THE INVENTION

The purpose of the present invention is thus to to eliminate all the aforesaid drawbacks, solving the problem of creating a stable connection between ring and casing of a shaft protection.

The invention solves the problem of providing a protective casing with ring for shafts, in particular Cardan shafts, of the type comprising, coaxially, a soft casing, and a ring in the form of a sleeve split longitudinally and a tubular element, both essentially rigid. A first sleeve end of the ring, oriented towards a joint of the shaft being can engage a circular groove of the inner fork of the joint. A second sleeve end of said ring, opposite to said first end, being adjacent to a constraining end of the casing encompassing said ring, presents on its inner surface circumferential projections, which engage openings on the tubular element. The ring presents on its outer surface, in proximity to its said second sleeve end, a multiplicity of projections, circumferentially equidistant, hook-shaped, bent back toward said first sleeve end and a multiplicity of longitudinal ribs having respective recessed end portions equally positioned; said casing presents in its constraining end a multiplicity of anchoring elements, circumferentially equidistant and separate, having a cylindrical inner surface that is coaxial to said tubular element. The anchoring elements have respective circumferential hook shaped protrusions, destined to juxtapose alternatively into the identical hook shaped ring protrusions, and teeth destined to engage in contact with said recessed end portions of longitudinal ribs of the ring. A split elastic locking ring, destined to position itself into a groove comprising said alternatively juxtaposed hook shaped protrusions of the casing and of the ring, stably holding together said casing and said ring.

BRIEF DESCRIPTION OF THE DRAWINGS

Additional characteristics of the invention shall be made more evident in the detailed description that follows, of a preferred embodiment shown purely by way of non limiting example in the enclosed drawings, in which.

DESCRIPTION OF THE PREFERRED EMBODIMENTS

Figure 1:
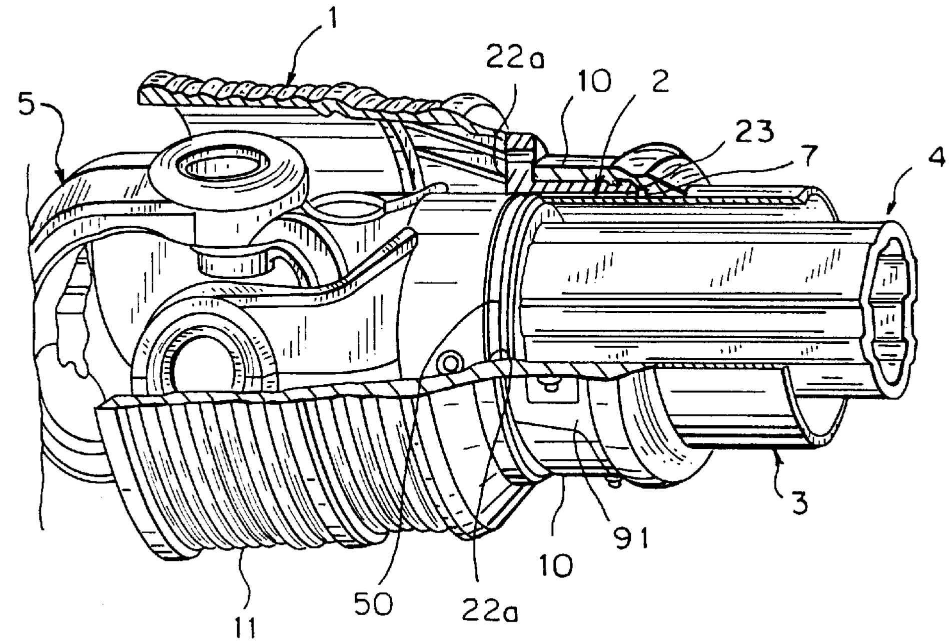
FIG. 1 is a prospective and partially cut off view of a protective device according to the present invention, applied to a cardanic shaft.

In accordance with the present invention, in the figures the number 1 indicates a protective casing, the numbers 2, 2' indicate a ring and the number 3 indicates a tubular element, cooperating in a coaxial protective set of a shaft, in particular a cardanic shaft, whereof in FIG. 1 is shown a portion 4 and a joint 5.

As in the prior art, the casing 1 is made of soft and deformable material, preferrably plastic.

The casing 1 presents an annular portion 10, of reduced diameter, destined to encompass the shaft 4 outside ring 2, and a portion 11 with one or more sectors of truncated cone or essentially cylindrical shape which encompass the joint 5. Thus, the casing 1 can be constructed in various lengths, and it generally presents a sector 11*a* with reinforcing fins 12 and seats 11*b* for stiffening rings like the one indicated as 6 in FIG. 2.

Figure 4:
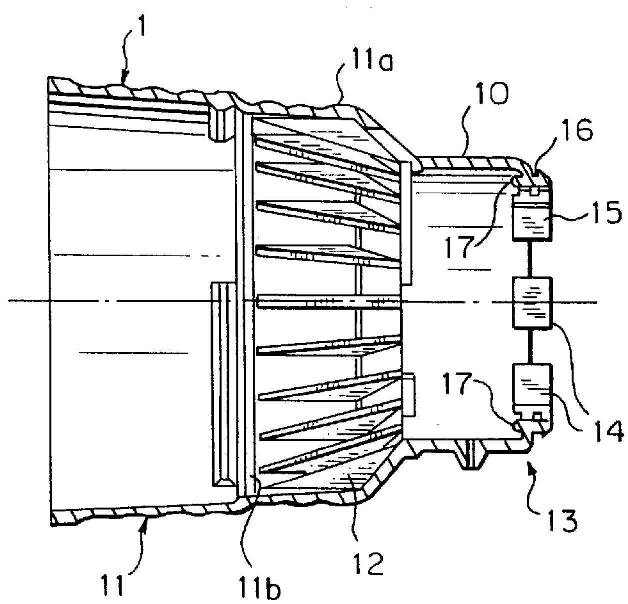
FIG. 4 shows a longitudinal section of a casing of the protective device shown in FIG. 2.
Figure 2:
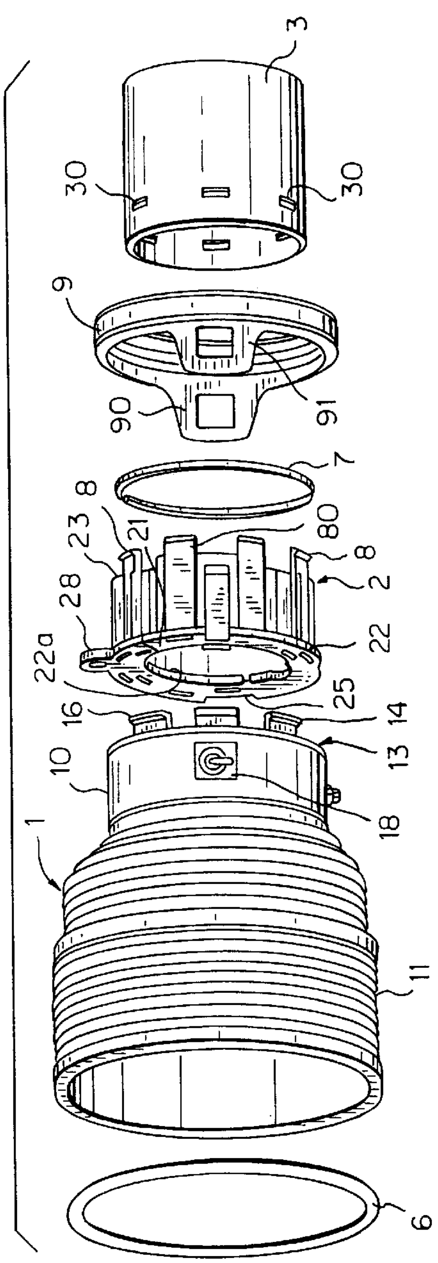
FIG. 2 is an exploded prospective view of the protective device as per FIG. 1.
Figure 7:
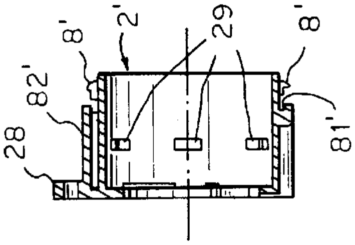
FIG. 7 is a longitudinal cross section view of the modified ring as per FIG. 5.
Figure 6:
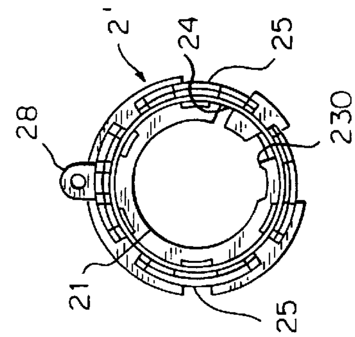
FIG. 6 is an end plan view of the modified ring as per FIG. 5.
Figure 5:
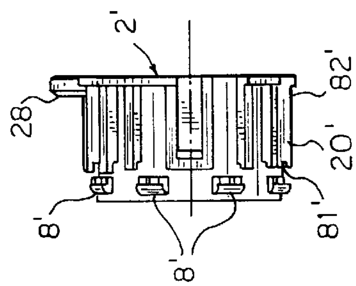
FIG. 5 is a side view of a ring with modifications with respect to the ring shown in FIG. 3.

According to the invention, as shown in particular in FIGS. 1, 2, and 4, the casing 1 presents, in its annular portion 10, a constraining end 13 with a multiplicity of anchoring elements 14, circumferentially equidistant and separate. Each anchoring element 14 has a cylindrical inner surface 15, recessing coaxially toward the shaft and presenting in its profile a hook shaped protrusion 16 in the free end, and in the opposite end a tooth 17.

As shall be seen farther on, the anchoring elements 14 are destined to be juxtaposed alternatively in analogous protrusions of the ring.

The ring is shown hereafter in two embodiment variants 2, 2'. In both variants (FIGS. 2, 3, 5, 6, 7), the ring is in the form of a sleeve 20 having a longitudinally split 21. A first end 22 of the sleeve 20, oriented toward the joint 5 of the shaft conventionally presents a circumferential protrusion 22*a* destined to engage with a circumferential groove 50 of the inner fork of the joint (FIG. 1). A second end 23 of the ring sleeve, opposite to the first end is adjacent to the constraining end 13 of the casing 1, when it is positioned as shown in FIG. 1, inserted from the left of the casing, inversely to what is shown in FIG. 2.

Moving on to describe the ring 2 (FIGS. 1 through 3), the first end 22 oriented toward the joint comprises radially the aforesaid circumferential protrusion 22*a*, provided with lighteners 230, 24 to favor its elastic deformation upon insertion into the fork groove 50. Radially towards the outside, the end 22 presents centering recesses 25 for correct insertion inside the casing 1, wherefrom traditionally protrudes a ring 28.

Centrally, in the sleeve portion 20 are formed equidistant protrusions 29 (FIGS. 3, 7) destined to engage with corresponding through openings 30 obtained in the tubular element 3.

Figure 3:
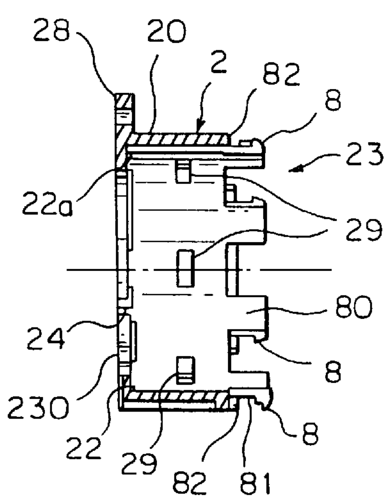
FIG. 3 shows a longitudinal section of a ring of the protective device shown in FIG. 2.

Referring specifically to FIG. 3, in the end 23 opposite to the joint 5, the ring 2 presents on its outer surface, in proximity to its said second end, a multiplicity of protrusions 8, circumferentially equidistant, hook shaped, bent back toward said first ring end. The protrusions 8 are destined to be juxtaposed alternatively with the hook shaped protrusions 16 of the anchoring portions 14 of the casing, when the casing 1 is inserted against the ring 2, having its own circumferential protrusion 22*a* inserted in the fork groove 50. In the ring 2 there is a multiplicity of longitudinal ribs 82, having respective end portions equally positioned and destined to act as stops for the teeth 17 of the anchoring portions 14.

The above also essentially applies for the ring variant 2'.

Returning to the ring 2, it can be seen that the multiplicity of protrusions 8, circumferentially equidistant, hook shaped, comprises, on respective ends, separate arms 80, protruding longitudinally from the sleeve 20. Thus it is possible for the anchoring elements 14 of the casing 1 to position themselves between the arms 80, directly in contact with the outer surface of the tubular element 3. The respective hook shaped protrusions 8, 16 of the ring 2 and of the casing 1 form a throat which serves as a seat for a locking ring 7, elastic and split (FIGS. 1 and 2). The ring 2 and the casing 1 stay in position in any case because the teeth of the anchoring elements 14 of the casing are held in contact against recesses 81 located below the longitudinal ribs 82 on the sleeve 20 of the ring.

Without repeating the description of the common parts, the ring 2' (FIGS. 5 through 7) differs from the ring 2 in that the protrusions 8', circumferentially equidistant, hook shaped, are constituted on the single piece of ring sleeve 20'. In this case the hook shaped protrusions 16 of the anchoring elements 14 of the casing are juxtaposed alternatively, resting not against the annular element 3, but directly onto the sleeve 20' of the ring. The tubular element thus is internal and does not interact directly with the casing. Similarly to the ring 2, the ring 2' has longitudinal ribs 82' with recesses 81' to receive the teeth 17 of the anchoring elements 14 of the casing.

Both with ring 2 and with its variant 2', a rigid annular safety element 9 is destined to cover the constraining ends, 13 and 22, respectively of the casing and of the ring, joined by the locking ring 7. The annular safety element 9 also presents at least two opposite holed fins 90, 91 destined to engage corresponding projections 18, 18 formed on the outer casing surface 10.

The invention thus conceived can be subject to numerous modifications and variations, without thereby departing from the scope of the inventive concept. Moreover, all components may be replaced with technically equivalent elements.

What is claimed:

1. Protective casing for cardanic shafts comprising coaxially, a soft casing, a ring in the form of a longitudinally split ring sleeve and a tubular element all essentially rigid; a first end of the ring sleeve, oriented toward a joint of the shaft being able to engage a circumferential groove on an inner fork of the joint, and a second end of said ring sleeve, opposite to said first end, being adjacent to a constraining end of said casing encompassing said ring, wherein:

said ring presents circumferential projections on an inner surface of the ring, located to engage correspondingly with through openings on the tubular element;

said ring proximate to said second end of the ring sleeve, having a multiplicity of hook shaped protrusions circumferentially equidistant bent back toward said first end of the ring sleeve and a multiplicity of longitudinal ribs having respective recessed terminal portions equally positioned;

said casing having on said constraining end a multiplicity of anchoring elements, circumferentially equidistant and separate from each other and each having a cylindrical inner surface coaxial to said tubular element; said anchoring elements having respective circumferential hook shaped protrusions, located to be juxtaposed alternatively into the hook shaped protrusions on the ring, and teeth located to engage in contact with said recessed terminal portions of longitudinal ribs of the ring;

a split elastic locking ring, positioned in a throat constituted by said alternatively juxtaposed hook shaped protrusions of the casing and of the ring, stably holding together said casing and said ring.

2. Device according to claim 1, wherein said multiplicity of hook shaped protrusions of the ring, circumferentially equidistant, extend from respective ends of separate arms, longitudinally protruding from said ring sleeve.

3. Device according to claim 1, wherein said multiplicity of hook shaped protrusions of the ring, circumferentially equidistant, is constituted on a single sleeve piece of the ring.

4. Device according to claim 1, further comprising a rigid annular safety element covering said constraining end and encompassing the casing and said ring joined by said locking ring; said annular safety element also having at least two opposite holed fins engage to corresponding projections formed on an outer surface of said casing.

* * * * *